United States Patent [19]

Cenegy

[11] Patent Number: 4,507,336

[45] Date of Patent: Mar. 26, 1985

[54] METHOD FOR PROTECTING A SUBSTRATE WITH A MULTI-DENSITY COMPOSITE POLYURETHANE

[76] Inventor: Louis F. Cenegy, 25411 Teton Way, El Toro, Calif. 92630

[21] Appl. No.: 344,504

[22] Filed: Feb. 1, 1982

[51] Int. Cl.³ .......................... B05D 5/00; B05D 1/02; B05D 1/34
[52] U.S. Cl. .................................. 427/244; 427/373; 427/426
[58] Field of Search .................. 427/244, 373, 426; 428/318.6, 319.3; 528/44, 78

[56] References Cited

U.S. PATENT DOCUMENTS

| | | | |
|---|---|---|---|
| 3,493,257 | 2/1970 | Fitzgerald et al. | 428/319.3 X |
| 3,649,324 | 3/1972 | Payne | 427/244 X |
| 3,873,407 | 3/1975 | Kumata et al. | 428/318.6 X |
| 3,967,028 | 6/1976 | Müller et al. | 427/244 X |

*Primary Examiner*—Evan K. Lawrence
*Attorney, Agent, or Firm*—Gausewitz, Carr, Rothenberg & Edwards

[57] ABSTRACT

A substrate, such as a roofing substrate, is protected by coating it with a low density polyurethane foam which is then coated with an essentially non-porous, dense, elastomeric polyurethane layer. The layer is formed by spraying a volatile-free spray of polyurethane precursor reactants onto the surface of the foam and rapidly reacting the precursors.

5 Claims, No Drawings

METHOD FOR PROTECTING A SUBSTRATE WITH A MULTI-DENSITY COMPOSITE POLYURETHANE

BACKGROUND OF THE INVENTION

This invention relates to the use of polymeric compositions for roofing and the like. More specifically, it relates to the use of such compositions containing polyurethane foams.

It is known to use polyurethane foam layers on roofs, walls, and the like, to protect against weather and provide insulation, among other things. One method of applying such foams involves spraying precursor reactants for polyurethanes directly onto wooden, metallic, or other roof substrates, and allowing the precursors to react in place to form a rigid foam layer. The layer is then painted, or otherwise coated, with a thin protective layer of paint to protect the polyurethane foam against damage, for example, from the weather.

Difficulties have been encountered using prior compositions and techniques, in that the resulting painted polyurethanes are soft and are easily damaged, for example, by workers walking on the roofs, by hail storms, or by the eventual wearing away or cracking of the protective paint layer.

To overcome some of these problems, attempts have been made to make sturdy polyurethane foams having densities sufficiently high to give structural rigidity to the foam sufficient to resist the expected abuse typically encountered. However, these attempts have been largely unsuccessful, because the polyurethane foam roofs with paint coatings have still been insufficiently sturdy for many uses, lack durability, require large amounts of reactants to form the high density foams, and are expensive not only in raw materials, but also in the amount of labor required to apply the materials to a roofing substrate. Also, the applications are often unduly time-consuming.

These and other problems of the prior art compositions and techniques can be overcome, or greatly alleviated, in accordance with the present invention.

SUMMARY OF THE INVENTION

This invention contemplates methods and techniques for applying composite structures of polyurethane foams sandwiched between a substrate, such as a roofing substrate, and a tough elastomeric coating which is applied as a covering for the urethane foam.

In accordance with the invention, a two-component polyurethane system comprising an isocyanate component and a polyol component is pumped and sprayed through a conventional urethane foam spray gun or mixing head directly upon a roof, wall, or other substrate. The components react immediately to expand and polymerize to form a low density polyurethane foam insulating layer, which may range typically from a fraction of an inch to about four inches in thickness. An elastomeric layer is then sprayed directly over the foam layer to coat and protect the same. The elastomeric layer is an essentially non-porous polyurethane, which is dense, tough, and does not expand significantly. It is formed by spraying a volatile-free spray of polyurethane precursor reactants onto the surface of the foam and rapidly reacting the precursors.

DETAILED DESCRIPTION OF THE INVENTION

The invention may be better understood by reference to the following examples in which a tough elastomeric layer is formed and test sprayed onto a specimen of very low density polyurethane foam insulation to achieve the results indicated:

EXAMPLE 1

The following ingredients, designated component "B" were mixed:

| | |
|---|---|
| Polypropylene glycol, ethylene oxide capped tiol 4800 molecular weight | 73.0 parts |
| 1.4 butanediol | 22.0 parts |
| di butyltin dilaurate | 1.0 |

The following were mixed and designated component "A":

| | |
|---|---|
| Modified liquid 4,4'diphenylmethane diisocyanate | 88.0 |
| Chlorinated paraffin 38.5% chlorine | 22.0 |

The components "A" and "B" were processed through a standard Gusmer FF spray foam machine onto a one inch thick piece of 1.5 lb. density urethane foam. The material was maintained at 115°-120° F. The reaction rate of the sprayed liquid was three seconds. The adhesion to the foam was excellent and the surface was usable within five minutes. The coating thickness approximated 50 mils and the density was 45 pounds per cubic foot and the shore hardness 75 A.

EXAMPLE 2

Component "B"

| | |
|---|---|
| Propylene oxide based, 2000 molecular weight diol | 65.0 parts |
| Diethylene glycol | 24.0 parts |
| 24% lead napthenate | 1.0 |

Component "A"

A 2.3 functionality polymethylene polyphenyl isocyanate was reacted with a 660 molecular weight diol containing 46% bromine to form a prepolymer. Reaction time at 75° F. was completed within 16 hours.

The mix ratio was:

| | |
|---|---|
| Isocyanate | 90.0 |
| Diol | 10.0 |

When the reaction was completed the prepolymer was blended with Tris (B-chloopropyl phosphate), a fire retardant, in the following ratio:

| | |
|---|---|
| Prepolymer | 96.0 |
| Fire retardant | 14.5 |

The material was processed at a ratio of 1:1 through standard spray foam to a thickness of 100 mils. The resultant product had an 85 Shore A hardness, a density of 50 lbs. per cubic ft. and was extremely fire retardant. Reaction time was four seconds.

EXAMPLE 3

Component "B" Blended

| | |
|---|---|
| A trifunctional poly (oxyalkylene) polyol containing 20% by weight polyurea in dispersion | 17.7 parts |
| A mixed phosphonate ester containing 19% by weight phosphorous with a hydroxyl number of 255 | 7.0 |
| A tetrafunctional amine based crosslinker with a 290 molecular weight | 18.0 |
| 1-4 butanediol | 2.0 |
| Non hydrolyzable silicone surfactant | .3 |

Component "A"

| | |
|---|---|
| A 2.7 functionality polymethylene polyphenyl isocyanate | 46.0 |
| Isodecyl diphenyl phosphate | 7.0 |

The material was processed through standard spray equipment to a thickness of 60 mils. The density was 62 pounds per cubic foot and the durometer was 750. Reaction time was 10 seconds. This was by far the hardest product applied to the foam.

To achieve optimum chemical bonding of the elastomeric layer with the underlying low-density foam layer, it is preferred that the foam layer be clean and essentially free of dirt, moisture, or excessively oxidized surface constituents. Thus, it is preferred that the elastomeric layer be applied within from about one minute to about 24 hours, preferably within about two hours of the completion of the curing of the foam layer. Alternatively, the foam can be protected by other means, if it is necessary to delay application of the elastomeric coating for long periods of time.

The foam substrate should be maintained at temperatures within the range of about 40° F. to about 120° F. and preferably in the range from about 70° F. to about 100° F. when the elastomeric coating is applied.

The elastomeric coating should be applied as a layer ranging above about 20 mils in thickness and preferably from about 40 to 100 mils. In particularly preferred embodiments, it is desired to use coatings in the range from about 50 to 70 mils in thickness to provide optimum economy while maintaining adequate coverage, sealing of the foam, high impact strength, and good penetration resistance.

The elastomeric coating itself is applied preferably at temperatures in the range from about 120° F. to about 140° F.

The elastomeric coatings of the present invention are essentially non-porous and are prepared from 100% reactive constituents so that there is no waste material, no volatiles to dispose of or which require drying or evaporation to finish the reaction and coating process.

The hardness of the elastomeric layer is much higher than that of the foam and may vary from about 20 Shore A to about 80 Shore D by varying the chemical composition of the reactants. To provide softer, more durable and flexible layers, isocyanates having a functionality of approximately 2, such as 4,4' diphenylmethane, diisocyanate, or similar reactants. The polyol choice would be a high molecular weight diol or triol, either propylene oxide or ethylene oxide cross-linked using an agent, such as a low molecular weight diol. Metallic or amine catalysts can be used to obtain desired reaction times.

To produce elastomeric layers in the higher hardness range, higher functionality isocyanates, such as polymethylene, polyphenyl isocyanate, together with high molecular weight diols and triols, can be used together with crosslinking agents having a functionality of up to four.

It is also contemplated to use various modifiers, such as fire retardants, extenders, pigments, and flow control agents, to enhance the characteristics of the raw materials, as well as those of the finished product.

Many other uses and variations of the invention will be apparent to those skilled in the art, and while specific embodiments of this invention have been described, these are intended for illustrative purposes only. It is intended that the scope of the invention be limited only to the attached claims.

What is claimed is:

1. A method for protecting a substrate comprising the steps of:
    applying a layer of low density polyurethane foam to the substrate,
    providing a volatile-free A component containing an isocyanate urethane precursor,
    providing a volatile-free B component containing a polyol urethane precursor,
    mixing a spray of catalyst means and said A component and said B component to provide a volatile-free spray of polyurethane precursors,
    spraying said substantially volatile-free spray onto the surface of said low density foam while maintaining said foam at a temperature within the range from about 40° F. to about 120° F., and
    reacting said polyurethane precursors in a reaction time up to about ten seconds to form an essentially non-porous elastomeric polyurethane coating above about 20 mils in thickness and having a hardness above about 20 Shore A.

2. The method recited in claim 1 wherein said spray is sprayed onto said low density foam in an amount sufficient to provide an elastomeric polyurethane coating having a thickness in the range from about 40 mils to about 100 mils.

3. The method recited in claim 1 wherein the hardness of said elastomeric coating is much higher than that of the foam and is in the range from about 20 Shore A to about 80 Shore D.

4. The method recited in claim 3 wherein said spray is sprayed onto said foam at temperatures in the range from about 120° F. to about 140° F.

5. The method recited in claim 1 wherein said low density polyurethane foam is applied to said substrate by spraying polyurethane foam precursors onto said substrate and reacting said precursors thereon, and wherein said substantially volatile-free spray is applied to said foam from about one minute to about two hours after completion of the curing of said foam.

* * * * *